United States Patent
Li et al.

(10) Patent No.: US 8,292,350 B2
(45) Date of Patent: Oct. 23, 2012

(54) INFLATABLE VEHICLE AIR DAM WITH BIDIRECTIONAL DEPLOY/STOW SYSTEM

(75) Inventors: Yunjun Li, West Bloomfield, MI (US); Peter T. Karlson, Whitby (CA); Theodore Adamczyk, Jr., Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 12/767,276

(22) Filed: Apr. 26, 2010

(65) Prior Publication Data

US 2011/0260499 A1 Oct. 27, 2011

(51) Int. Cl.
*B60J 9/00* (2006.01)

(52) U.S. Cl. .................................................. 296/180.1

(58) Field of Classification Search ............... 296/180.1, 296/901.1, 181.2, 180.2, 180.3, 217, 180.5, 296/1.01; 180/903
See application file for complete search history.

(56) References Cited

U.S. PATENT DOCUMENTS

| | | | |
|---|---|---|---|
| 4,398,764 A | 8/1983 | Okuyama | |
| 4,659,130 A | 4/1987 | Dimora et al. | |
| 4,778,212 A | 10/1988 | Tomforde | |
| 4,904,016 A | 2/1990 | Tatsumi et al. | |
| 4,976,489 A | 12/1990 | Lovelace | |
| 6,209,947 B1 | 4/2001 | Rundels | |
| 6,962,388 B1 | 11/2005 | Flores | |
| 7,040,690 B2 | 5/2006 | Soja et al. | |
| 7,055,891 B2 | 6/2006 | Jungert | |
| 2007/0216194 A1 | 9/2007 | Rober et al. | |
| 2007/0257512 A1 | 11/2007 | Anderson | |
| 2008/0303309 A1 | 12/2008 | Dayton | |
| 2010/0219661 A1* | 9/2010 | Butlin et al. | ............... 296/180.1 |

FOREIGN PATENT DOCUMENTS

| | | |
|---|---|---|
| DE | 3145257 A1 | 5/1983 |
| DE | 10160748 A1 | 6/2003 |
| DE | 202004002170 U1 | 3/2005 |
| DE | 102005047113 A1 | 4/2007 |
| DE | 102006060672 A1 | 6/2008 |
| EP | 1595756 A2 | 11/2005 |
| EP | 1905674 A1 | 2/2008 |
| EP | 1870320 B1 | 11/2009 |
| WO | WO2005058677 A1 | 6/2005 |

* cited by examiner

*Primary Examiner* — Glenn Dayoan
*Assistant Examiner* — Melissa Black

(57) ABSTRACT

A vehicle has an inflatable air dam assembly that is deployed and stowed by a bidirectional deploy/stow system. The deployment and stowing may be based on vehicle speed. The deploy/stow system includes an air compressor and first and second valves for directing air into and out of the air dam assembly. The compressor operates on both deploy and stow operations to fill and evacuate, respectively, the air dam assembly.

20 Claims, 4 Drawing Sheets

INFLATABLE VEHICLE AIR DAM WITH BIDIRECTIONAL DEPLOY/STOW SYSTEM

BACKGROUND OF INVENTION

The present invention relates generally to an inflatable air dam for a vehicle and more particularly provides a bidirectional system for inflating and deflating the air dam assembly.

It is known that the aerodynamic characteristics of vehicles can be improved by an air dam mounted underneath the front bumper of the car and extending into proximity with the roadway. A disadvantage of such an air dam is that its extending downward into proximity with the road surface creates a potential interference with curbs or like obstructions extending above the normal road surface.

As a result, some have developed inflatable air dam assemblies that allow the air dam to be deflated under vehicle operating conditions where potential interference with objects such as curbs is high and inflated under vehicle operating conditions that are most beneficial to improving the aerodynamic characteristics of the vehicle, such as when the vehicle is traveling at higher speeds. It is desirable to provide an improved air dam assembly of simplified construction, operation and lower cost, and with quick and accurate inflation/deflation capabilities while minimizing the weight and packaging space taken in the vehicle.

SUMMARY OF INVENTION

An embodiment contemplates a method of inflating and deflating an inflatable air dam assembly mounted under a front end of a vehicle, the method comprising the steps of: (a) detecting that a speed of the vehicle is greater than a first predetermined speed threshold; (b) controlling a first valve to direct compressed air from an air compressor to the inflatable air dam assembly and controlling a second valve to direct air from atmosphere into the air compressor, if the speed of the vehicle is greater than the first predetermined speed threshold; (c) activating the air compressor to pump air through the first valve and into the inflatable air dam assembly, if the speed of the vehicle is greater than the first predetermined speed threshold, to thereby inflate the inflatable air dam assembly to a deployed position; (d), after steps (b) and (c), deactivating the air compressor and controlling the first and second valves to prevent air from flowing out of the air dam assembly to thereby maintain the inflatable air dam assembly in the deployed position; (e), after step (d), detecting if the speed of the vehicle is less than a second predetermined speed threshold; (f), after step (e), controlling the first valve to direct air from the air compressor to atmosphere and controlling the second valve to direct air from the inflatable air dam assembly into the air compressor, if the speed of the vehicle is less than the second predetermined speed threshold; and (g), after step (e), activating the air compressor to pump air through the second valve from the inflatable air dam assembly and out to atmosphere through the first valve, if the speed of the vehicle is less than the second predetermined speed threshold, to thereby deflate the inflatable air dam assembly to a stowed position.

An embodiment contemplates a vehicle having a front end comprising an inflatable air dam assembly and a bidirectional deploy/stow system. The inflatable air dam assembly is mounted to the front end and includes a forward wall in front of and spaced from a rearward wall and a bottom wall that define a hollow interior sealed air space. A stem engages the air space to selectively allow for air entry into and from the air space. The bidirectional deploy/stow system includes an air compressor, a first valve and a second valve. The air compressor has an outlet in fluid communication with the first valve and an inlet in fluid communication with the second valve. The first valve is controllable to selectively direct air flow from the first valve to the stem and to atmosphere, and the second valve is controllable to selectively direct air flow into the second valve from atmosphere and from the stem. When the bidirectional deploy/stow system is in a fill mode, the air compressor draws air from atmosphere through the second valve and directs air into the stem through the first valve, and when the bidirectional deploy/stow system is in an evacuation mode, the air compressor draws air from the stem through the second valve and directs air to atmosphere through the first valve.

An advantage of an embodiment is that the inflatable air dam assembly improves the overall vehicle fuel economy while avoiding concerns with damage to the air dam at low vehicle speeds, all while being able to precisely and quickly inflate and deflate the air dam. This air dam assembly and bidirectional deploy/stow system also minimizes weight, cost and packaging space.

DETAILED DESCRIPTION

Figure 1:
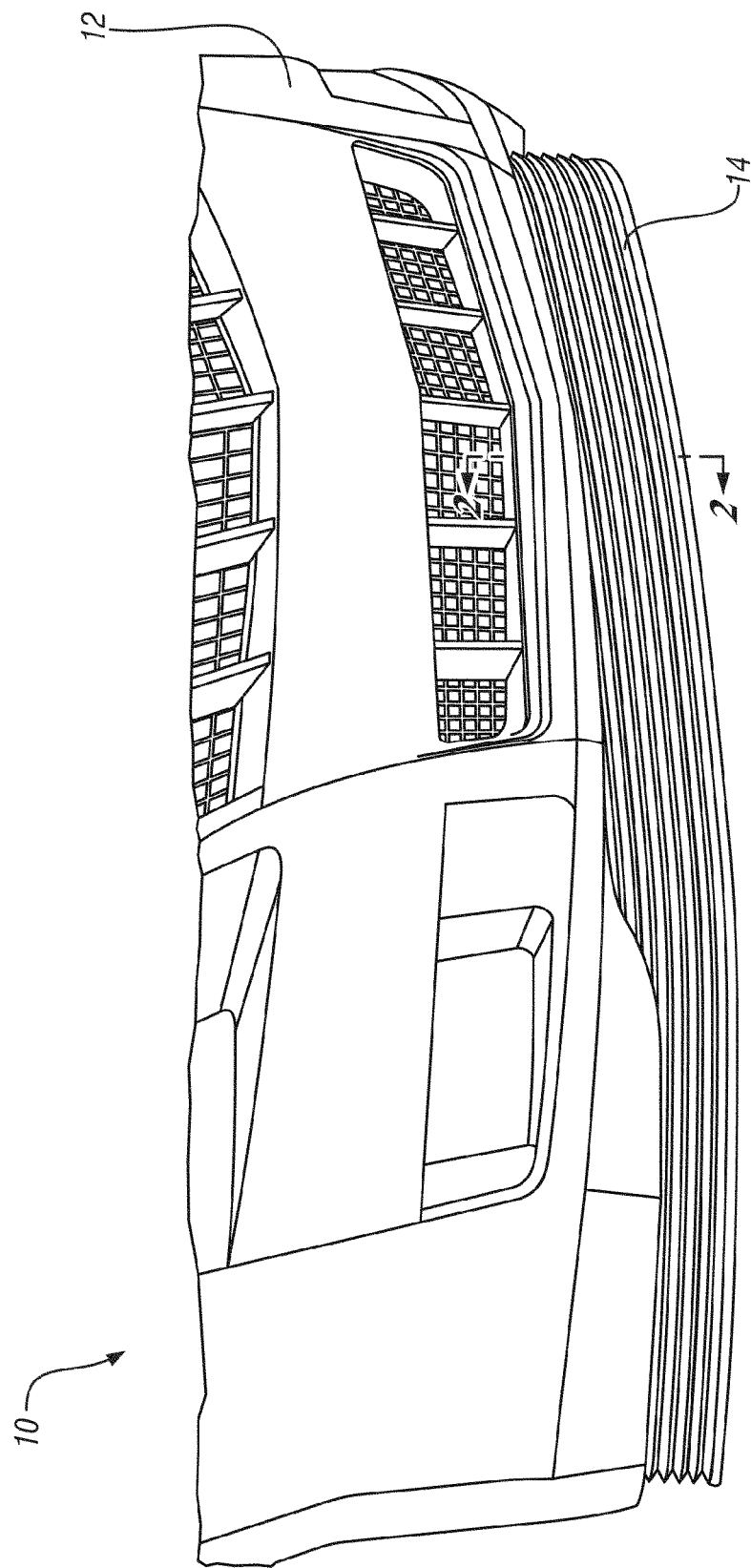
FIG. 1 is a perspective view of the front of a vehicle showing the air dam assembly in its extended position.

Referring to FIG. 1, it is seen that a vehicle generally indicated at 10 has a molded plastic front fascia 12 that conceals a front bumper bar and other structure of the vehicle body, not shown. An air dam assembly 14 is attached to the underside of the vehicle 10 and is shown in FIG. 1 at an extended position in which the air dam assembly 14 will partially close out the space between the under side of the vehicle and the road surface in order to improve the aerodynamic characteristics of the vehicle. The particular inflatable air dam assembly 14 discussed herein is one example of an inflatable air dam that may be employed with the bidirectional deploy/stow system, discussed below.

Figure 2:
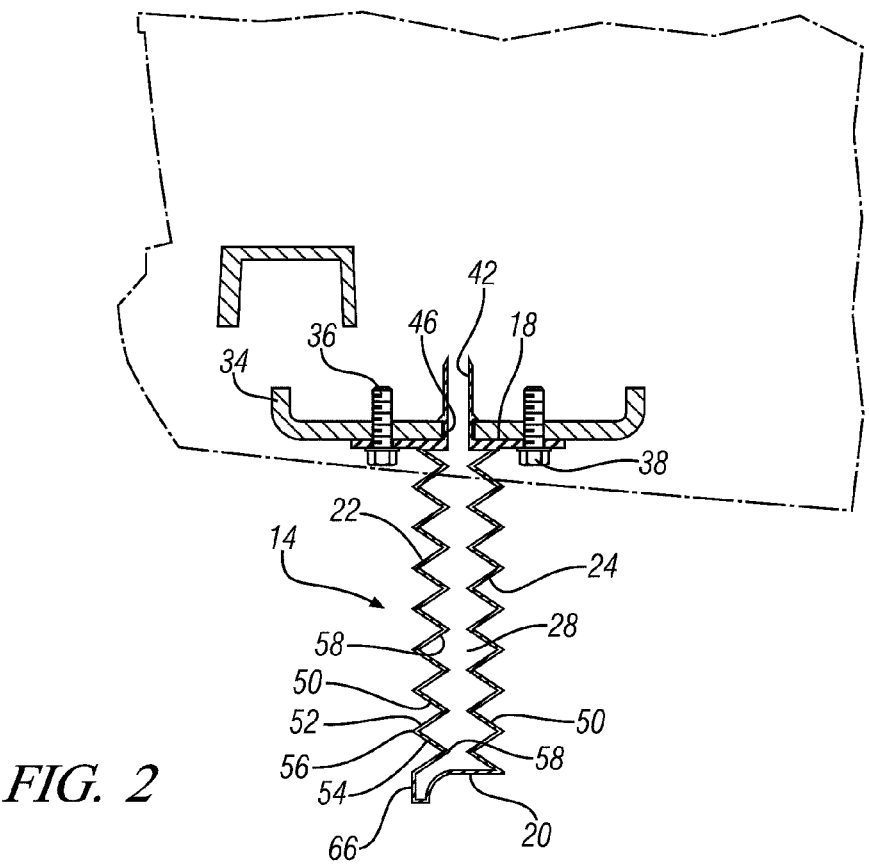
FIG. 2 is a section view taken through the air dam assembly in the direction of arrows 2-2 of FIG. 1.
Figure 3:
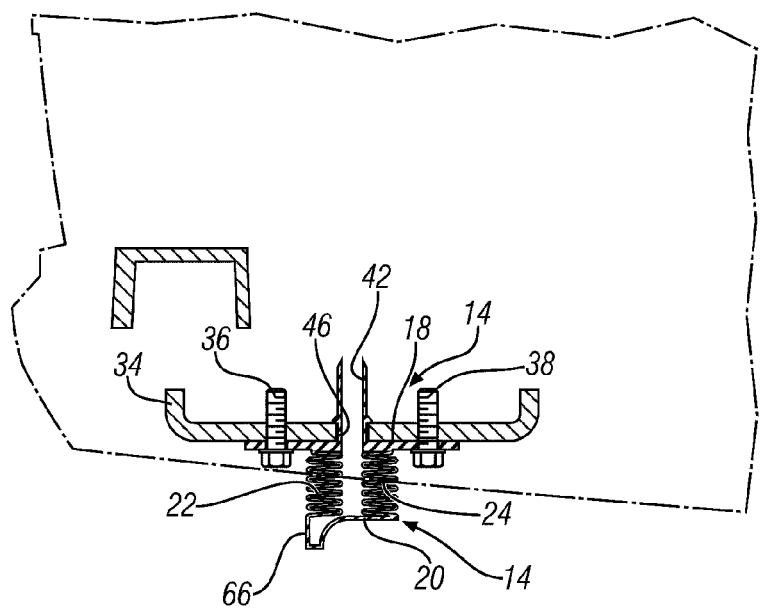
FIG. 3 is a section view similar to FIG. 2 but showing the air dam in its withdrawn position stored beneath the front of the vehicle.

Referring now to FIGS. 2 and 3 it will be seen that the air dam assembly 14 is comprised of a one-piece blow molded plastic assembly that includes generally a top wall 18, a bottom wall 20, a forward wall 22, and a rearward wall 24. These walls cooperate to define a hollow interior sealed air space 28, and the walls have thicknesses that prove the generally self supporting shape of FIG. 2, as opposed to being of a thinner material that would not be self supporting of the shape disclosed herein. The top wall 18 is generally planar and is suitably attached to the underside of a suitable vehicle body structure 34 by screws 36 and 38. A hollow stem 42 is molded integrally with the top wall 18 and extends upwardly through an aperture 46 provided in the structure 34. This stem 42 may include a quick connect/disconnect feature for ease of assembly/disassembly if so desired.

Referring to FIG. 2 the forward wall 22 and the rearward wall 24 are each formed of a plurality of serially arranged horizontal extending pleats 50. A typical pleat 50 includes an upper pleat portion 52 and a lower pleat portion 54 that are joined together by an outer living hinge 56. Each of these pleats 50 is in turn connected to the adjacent pleat 50 by inner living hinges 58. Thus the forward wall 22 and the rearward wall 24 consist of alternating pleat portions 52 and 54 that are connected by living hinges 56 and 58 that are arranged in accordion fashion by which the forward wall 22 and rearward walls can be folded and unfolded via flexure of the living hinges 56 and 58. These living hinges and pleats are formed in the blow-molding process of forming the air dam assembly 14.

The bottom wall 20 of the air dam assembly spaces apart the forward wall 22 and the rearward wall 24. A front lower lip structure 66 depends downwardly from the forward wall 22 and the bottom wall 20 to stiffen the lower edge of the air dam assembly 14.

The overall shape of the air dam assembly 14 is curved or arcuate when seen from above so that the air dam assembly 14 will generally match the curvature of the front of the vehicle. More importantly, this curved shape of the air dam assembly 14 causes the pleats 50 to also follow the curved path and in so doing the curvature of the pleats 52 and 54 and living hinges 56 and 58 will cooperate to generally stiffen the forward wall 22 and the rearward wall 24 against movement that might be induced by the on rushing air stream as the vehicle is traveling at high speeds. Furthermore, the pleated shape of the forward wall 22 and rearward wall 24 will cooperate to maintain a reliable distance between the forward wall 22 and rearward wall 24, thereby giving the air dam assembly 14 a predetermined shape against flexure in the fore and aft direction.

Referring now to FIG. 3 the air dam assembly 14 is shown in a withdrawn position in which the bottom wall 20 has been retracted upwardly into closer proximity with the top wall 18 as permitted by the flexure of the living hinges 56 and 58 and the folding up of the pleat portions 52 and 54. Thus, in FIG. 3 the air dam assembly 14 has been withdrawn to a stored position which is substantially away from possible interference with curbs or similar obstructions.

It will be understood that the air dam assembly 14 can be blow molded in either the extended position of FIG. 2 or the withdrawn position of FIG. 3. For example if the air dam assembly 14 is molded in the extended position of FIG. 2, the living hinges 56 and 58 will constantly urge the air dam assembly 14 to its extended position and the air dam assembly 14 can only be retracted by exerting sufficient force on the air dam assembly 14 to overcome the natural and inherent spring effect of the living hinges 56 and 58. On the other hand, if the air dam assembly 14 is molded in the withdrawn position of FIG. 4, the living hinges 56 and 58 will inherently urge the air dam assembly 14 to the withdrawn position and it will be necessary to exert sufficient force to extend the air dam assembly 14 to its extended position of FIG. 2. Alternatively, with the control mechanism of FIGS. 4-6 the air dam assembly 14 can be molded in a condition that is midway between the extended position and the retracted position.

Figure 4:
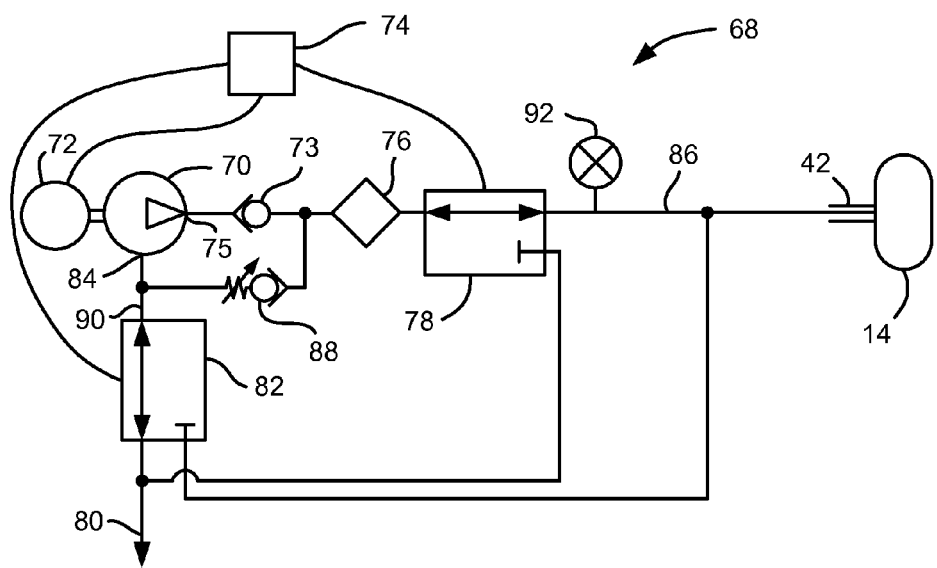
FIG. 4 is a schematic diagram illustrating a bidirectional deploy/stow system connected to the air dam assembly, with valves in air dam fill positions.
Figure 5:
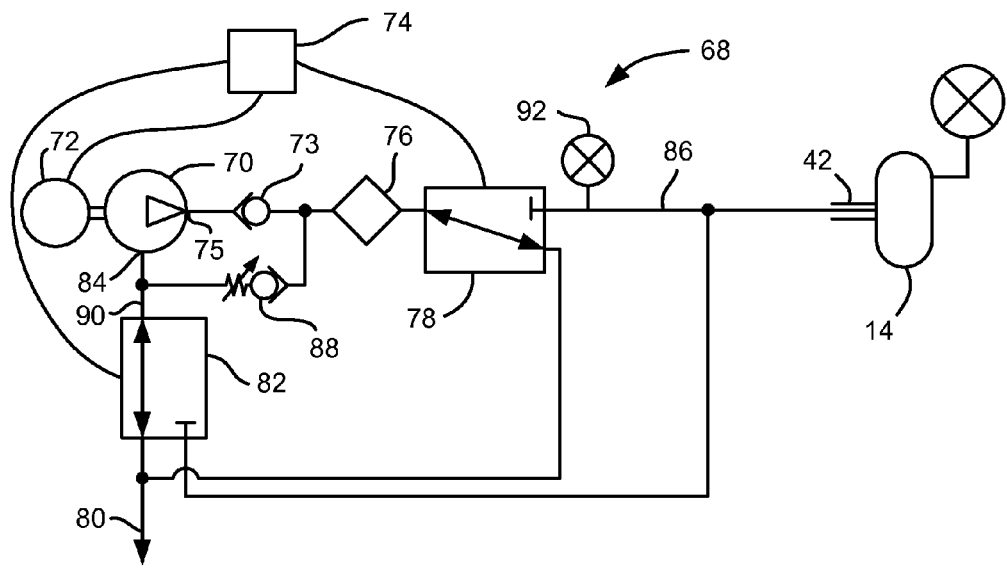
FIG. 5 is a schematic diagram illustrating the bidirectional deploy/stow system connected to the air dam assembly, with the valves in air dam hold positions.
Figure 6:
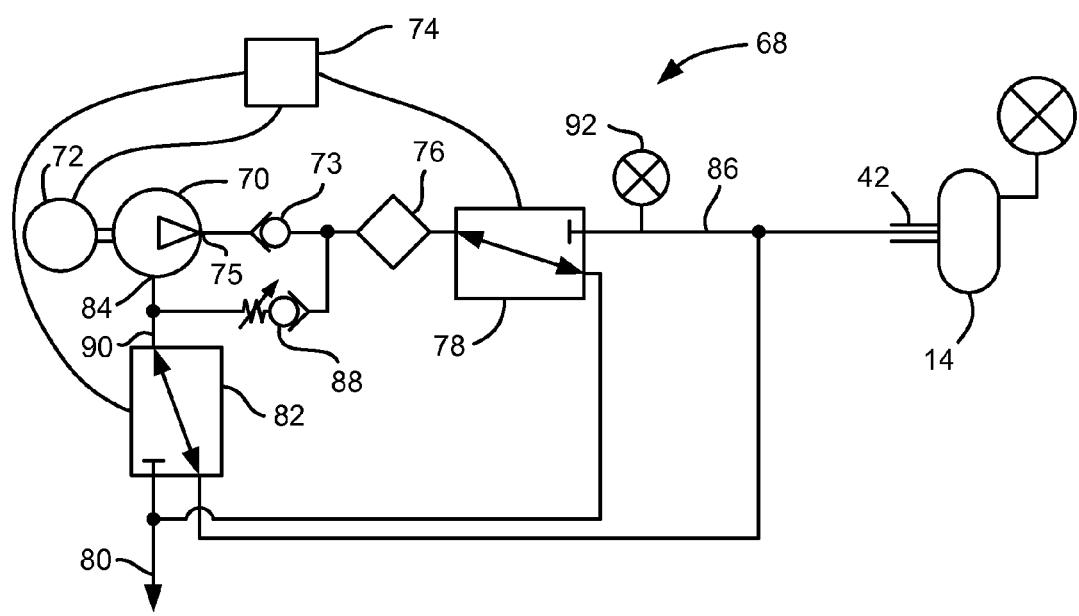
FIG. 6 is a schematic diagram illustrating a bidirectional deploy/stow system connected to the air dam assembly, with valves in air dam evacuate positions.

FIGS. 4-6 show the bidirectional deploy/stow system 68 for moving the air dam assembly 14 between the extended position (shown in FIG. 2) and the withdrawn position (shown in FIG. 3). This system 68 includes an air compressor 70 that may be driven by a motor 72 (or by another means).

The motor 72 may be controlled by a controller 74, which may be a separate controller or may be part of a controller that is used to control other vehicle functions. This controller 74 may be made up of various combinations of hardware and software as is known to those skilled in the art.

The compressor 70 directs air through an outlet 75 to a dryer 76, which ensures that moisture is not trapped in the system 68. Optionally, a one-way check valve 73 is inserted between the compressor outlet 75 and the dryer 76. The air is then directed from the dryer 76 to a first valve 78. This first valve 78 may be, for example, a solenoid valve, although other types of controllable valves may be used instead if so desired. The first valve 78 is controlled by the controller 74, which can switch the valve 78 between directing the air through to the stem 42 of the air dam assembly 14 or directing the air to an outlet 80 to atmosphere.

A second valve 82 is in fluid communication with an inlet 84 to the air compressor 70. This valve 82 may also be, for example, a solenoid valve. Again, other types of controllable valves may be used instead if so desired. The second valve 82 is controlled by the controller 74, which can switch the second valve 82 between connecting the inlet 84 to the outlet 80 to atmosphere and connecting the inlet 84 to an air line 86 extending between the first valve 78 and the stem 42 of the air dam assembly 42.

The bidirectional deploy/stow system 68 may also include an optional valve 88 that is positioned to selectively allow flow from between the dryer 76 and the line 90 extending between the second valve 82 and the compressor inlet 84. This valve 88 can be, for example, a variable one-way check valve or a solenoid valve. The optional valves 73, 88 may be employed to allow the dryer 76 to periodically regenerate.

For regeneration, the first and second valves 78, 82 are set in the positions shown in FIG. 4, the compressor 70 is off, the air dam assembly 14 is inflated, and the valve 88 is adjusted to allow airflow through it. The air in the air dam assembly 14 will then flow through the first valve 78, the dryer 76, the valve 88, the second valve 82 and out to atmosphere to take moisture out of the system 68.

As an additional option, the valve 88 can be employed to allow air flow as a failure mode if the air compressor 70 fails to exhaust air out of the air dam assembly 14.

Fittings on the compressor 70 and first and second valves 78, 82 may have quick connect/disconnect features for easy assembly/disassembly if so desired. In addition, the first and second valves 78, 82 may be constant flow rate or variable flow rate valves, as desired for the particular application of this bidirectional deploy/stow system 68.

The operation of the bidirectional deploy/stow system 68 and its use in inflating and deflating the air dam assembly 14 will now be discussed relative to FIGS. 1-6. When the vehicle 10 is traveling down a road and the vehicle speed exceeds a first predefined vehicle speed threshold, the controller 74 will cause the valves 78, 82 to be positioned as in FIG. 4 (air dam fill positions) and the motor 72 will be turned on to drive the air compressor 70. The compressor 70 will draw air into its inlet 84 from atmosphere via the second valve 82. The compressed air will be pushed through the compressor outlet 75, through the dryer 76, where moisture is removed, and through the first valve 78, where it is then directed through the stem 42 into the air dam assembly 14. This will cause the air dam assembly 14 to inflate. Alternatively, the first predefined vehicle threshold may need to be exceeded for a first predetermined time period before the controller will activate this air dam fill mode of operation.

The motor 72 continues operating until the air dam assembly 14 is inflated the desired amount. The determination as to the amount of inflation may be made, for example, by operating the motor 72 for predetermined time periods, monitoring the air pressure in the air dam assembly 14 (which may require a pressure sensor to be added to the air dam assembly), or employing a displacement sensor to detect the expansion of the air dam assembly (which may require the addition of the displacement sensor to the air dam assembly). If one employs an optional pressure sensor 92, then it may be, for example, adjacent to the outlet of the first valve 78. Alternatively, the optional pressure sensor may be located adjacent to the inlet of the first valve 78 or installed adjacent to the stem 42, if so desired.

Once the air dam assembly is inflated the desired amount, the controller 74 deactivates the motor and actuates the first valve 78 to the position shown in FIG. 5 (air dam hold position). In this air dam hold mode, the air in the air dam assembly 14 cannot flow out through either of the valves 78, 82, so the air dam assembly 14 will remain inflated. Preferably the default positions for the first and second valves 78, 82 are those shown in FIG. 5, where the default positions are valve positions that require low or no energy to maintain the valves in these positions.

When the vehicle 10 is traveling with the air dam assembly 14 deployed and the vehicle speed drops below a second predefined speed threshold, the controller 74 will cause the valves 78, 82 to be positioned as in FIG. 6 (air dam evacuate positions) and the motor 72 will be turned on to drive the air compressor 70. The compressor 70 will draw air into its inlet 84 from the air dam assembly 14 via the second valve 82. The compressed air will be pushed through the compressor outlet 75, through the dryer 76, and through the first valve 78, where it is then directed through the outlet 80 to atmosphere. This will cause the air dam assembly 14 to deflate. Alternatively, the second predefined vehicle threshold may need to be exceeded (i.e., lower than this speed) for a second predetermined time period before the controller 74 will activate this air dam evacuate mode of operation.

The motor 72 continues operating until the air dam assembly 14 is deflated the desired amount. The amount of deflation may be determined as discussed above relative to inflation (e.g., a give time period, a pressure sensor, or a position sensor). Once the air dam assembly is deflated the desired amount, the controller 74 deactivates the motor and actuates the second valve 82 to the position shown in FIG. 5 (air dam hold positions). In this air dam hold mode, the air cannot flow into the air dam assembly 14 through either valve 78, 82, so the air dam assembly will remain in its stowed position.

One will note that the bidirectional deploy/stow system 68 uses the air compressor 70 for both inflating and deflating the air dam assembly 14. This allows for quick and precise inflation and deflation of the air dam assembly 14.

The first predetermined vehicle speed may be the same as the second predetermined vehicle speed, although it is generally more desirable for the second predetermined vehicle speed to be less than the first predetermined vehicle speed. Also, the first and second predetermined time periods may be equal or may be different amounts of time. In general, these predetermined time periods may depend upon the particular vehicle to which the air dam assembly is mounted and the configuration of the particular air dam assembly employed. And, of course, the predefined vehicle speeds and time periods can be calibrated based on system requirements.

In addition, if so desired, a manually operated switch (not shown) may be mounted in the vehicle passenger compartment and connected to the controller 74. The switch can be employed to override the automatic control and keep the air dam assembly in its stowed position at all vehicle speeds.

While certain embodiments of the present invention have been described in detail, those familiar with the art to which this invention relates will recognize various alternative designs and embodiments for practicing the invention as defined by the following claims.

What is claimed is:

1. A method of inflating and deflating an inflatable air dam assembly mounted under a front end of a vehicle, the method comprising the steps of:
   (a) detecting that a speed of the vehicle is greater than a first predetermined speed threshold;
   (b) controlling a first valve to direct compressed air from an air compressor to the inflatable air dam assembly and controlling a second valve to direct air from atmosphere into the air compressor, if the speed of the vehicle is greater than the first predetermined speed threshold;
   (c) activating the air compressor to pump air through the first valve and into the inflatable air dam assembly, if the speed of the vehicle is greater than the first predetermined speed threshold, to thereby inflate the inflatable air dam assembly to a deployed position;
   (d) after steps (b) and (c), deactivating the air compressor and controlling the first and second valves to prevent air from flowing out of the air dam assembly to thereby maintain the inflatable air dam assembly in the deployed position;
   (e) after step (d), detecting if the speed of the vehicle is less than a second predetermined speed threshold;
   (f) after step (e), controlling the first valve to direct air from the air compressor to atmosphere and controlling the second valve to direct air from the inflatable air dam assembly into the air compressor, if the speed of the vehicle is less than the second predetermined speed threshold; and
   (g) after step (e), activating the air compressor to pump air through the second valve from the inflatable air dam assembly and out to atmosphere through the first valve, if the speed of the vehicle is less than the second predetermined speed threshold, to thereby deflate the inflatable air dam assembly to a stowed position.

2. The method of claim 1 including step (h) after steps (f) and (g), deactivating the air compressor and controlling the first and second valves to prevent air from flowing into the air dam assembly to thereby maintain the inflatable air dam assembly in the stowed position.

3. The method of claim 2 wherein step (c) is further defined by operating the air compressor for a predetermined time period before deactivating the air compressor to assure a desired deflation of the inflatable air dam assembly is achieved.

4. The method of claim 1 wherein:
   step (e) is further defined by detecting that the speed of the vehicle is less than the second predetermined speed threshold for a second predetermined time period; and
   steps (f) and (g) are further defined by control of the first and second valves and activation of the air compressor being based on the vehicle speed being less than the second predetermined speed threshold for at least the second predetermined time period.

5. The method of claim 1 wherein step (c) is further defined by the air compressor being activated by activating a motor that drives the air compressor.

6. The method of claim 1 wherein steps (b), (c), (f) and (g) are further defined by a controller controlling the first and second valves and activating the air compressor.

7. The method of claim 1 wherein step (d) is further defined by operating the air compressor for a predetermined time period before deactivating the air compressor to assure a desired inflation of the inflatable air dam assembly is achieved.

8. The method of claim 1 wherein:
step (a) is further defined by detecting that the speed of the vehicle is greater than the first predetermined speed threshold for a first predetermined time period; and
steps (b) and (c) are further defined by control of the first and second valves and activation of the air compressor being based on the vehicle speed being greater than the fist predetermined speed threshold for at least the first predetermined time period.

9. The method of claim 1 wherein the first predetermined speed threshold is greater than the second predetermined speed threshold.

10. The method of claim 1 wherein step (c) is further defined by directing air flowing from the air compressor through a dryer before the air enters the inflatable air dam assembly.

11. The method of claim 10 wherein step (c) is further defined by directing air flowing from the air compressor through a first one-way check valve before the air enters the dryer, and including step (h) selectively directing air from between the first one-way check valve and the dryer through a regeneration valve to a line extending between the air compressor and the second valve to allow for regeneration of the dryer.

12. A vehicle having a front end comprising:
an inflatable air dam assembly mounted to the front end and including a forward wall in front of and spaced from a rearward wall and a bottom wall that define a hollow interior sealed air space, and a stem engaging the air space to selectively allow for air entry into and from the air space; and
a bidirectional deploy/stow system including an air compressor, a first valve and a second valve, the air compressor having an outlet in fluid communication with the first valve and an inlet in fluid communication with the second valve, the first valve being controllable to selectively direct air flow from the first valve to the stem and to atmosphere, and the second valve being controllable to selectively direct air flow into the second valve from atmosphere and from the stem; whereby when the bidirectional deploy/stow system is in a fill mode, the air compressor draws air from atmosphere through the second valve and directs air into the stem through the first valve, and when the bidirectional deploy/stow system is in an evacuation mode, the air compressor draws air from the stem through the second valve and directs air to atmosphere through the first valve.

13. The vehicle of claim 12 wherein the bidirectional deploy/stow system includes a motor that engages and drives the air compressor.

14. The vehicle of claim 12 wherein the first valve is a solenoid valve.

15. The vehicle of claim 12 wherein the second valve is a solenoid valve.

16. The vehicle of claim 12 wherein the bidirectional deploy/stow system includes a controller and the controller is in communication with and controls the positions of the first and second valves.

17. The vehicle of claim 12 wherein the forward wall includes a plurality of pleats connected by a plurality of living hinges to form an accordion shaped forward wall, and the rearward wall includes a plurality of pleats connected by a plurality of living hinges to form an accordion shaped rearward wall.

18. The vehicle of claim 17 wherein the forward wall is curved to correspond to a curvature of the front end of the vehicle.

19. A vehicle having a front end comprising:
an inflatable air dam assembly mounted to the front end and including a forward wall in front of and spaced from a rearward wall and a bottom wall that define a hollow interior sealed air space, and a stem engaging the air space to selectively allow for air entry into and from the air space; and
a bidirectional deploy/stow system including an air compressor, a first valve and a second valve, the air compressor having an outlet in fluid communication with the first valve and an inlet in fluid communication with the second valve, the first valve being controllable to selectively direct air flow from the first valve to the stem and to atmosphere, and the second valve being controllable to selectively direct air flow into the second valve from atmosphere and from the stem; the bidirectional deploy/stow system including a dryer located downstream from the air compressor, whereby air flowing from the compressor through the dryer will have moisture removed from the air; and whereby when the bidirectional deploy/stow system is in a fill mode, the air compressor draws air from atmosphere through the second valve and directs air into the stem through the first valve, and when the bidirectional deploy/stow system is in an evacuation mode, the air compressor draws air from the stem through the second valve and directs air to atmosphere through the first valve.

20. The vehicle of claim 19 wherein the bidirectional deploy/stow system includes a first one-way check valve located downstream from the air compressor and upstream from the dryer and a regeneration valve that is configured to selectively allow air flow from between the first valve and the dryer to be directed out to atmosphere.

* * * * *